United States Patent
Piazza et al.

(10) Patent No.: US 8,072,451 B2
(45) Date of Patent: Dec. 6, 2011

(54) EFFICIENT Z TESTING

(75) Inventors: Thomas Piazza, Granite Bay, CA (US); Eric Samson, Folsom, CA (US); Nasseh Akaaboune, Fair Oaks, CA (US); Dinakar Munagala, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 11/023,639

(22) Filed: Dec. 29, 2004

(65) Prior Publication Data

US 2006/0139366 A1 Jun. 29, 2006

(51) Int. Cl.
*G06T 15/40* (2006.01)
*G09G 5/02* (2006.01)
*G09G 5/36* (2006.01)

(52) U.S. Cl. .......... 345/421; 345/592; 345/556

(58) Field of Classification Search .......... 345/421, 345/422, 418, 556, 530, 506, 502, 501, 592
See application file for complete search history.

(56) References Cited

U.S. PATENT DOCUMENTS

| | | | |
|---|---|---|---|
| 5,684,942 A * | 11/1997 | Kimura .......... | 345/473 |
| 5,864,342 A * | 1/1999 | Kajiya et al. .......... | 345/418 |
| 5,977,987 A * | 11/1999 | Duluk, Jr. .......... | 345/441 |
| 6,166,743 A | 12/2000 | Tanaka | |
| 6,219,058 B1 * | 4/2001 | Trika .......... | 345/423 |
| 6,271,851 B1 | 8/2001 | Hsiao et al. | |
| 6,411,294 B1 * | 6/2002 | Furuhashi et al. .......... | 345/421 |
| 6,456,285 B2 * | 9/2002 | Hayhurst .......... | 345/422 |
| 6,636,214 B1 * | 10/2003 | Leather et al. .......... | 345/422 |
| 6,680,737 B2 | 1/2004 | Ashburn et al. | |
| 2003/0080959 A1 | 5/2003 | Morein | |
| 2004/0119710 A1 | 6/2004 | Piazza et al. | |

FOREIGN PATENT DOCUMENTS

| | | |
|---|---|---|
| TW | 449729 | 8/2001 |
| WO | WO-2004 061776 | 7/2004 |

OTHER PUBLICATIONS

Taiwan IPO Search Report, dated May 11, 2007, issued in TW94147272.

* cited by examiner

*Primary Examiner* — Joni Hsu
(74) *Attorney, Agent, or Firm* — Trop, Pruner & Hu, P.C.

(57) ABSTRACT

Z testing during computer graphics rendering is performed in a manner so as to optimize rendering. The status of a pixel as non-promotable may be tracked using a pixel status array (PSA). Each PSA row may contain bits which correspond to the non-promotable status of pixels. Each row may include five pixels, the first four of which represent the pixels in a subspan. If the row corresponds to a valid subspan, a determination may be made as to whether any pixel in the subspan is represented by a one, indicating that the pixel is non-promotable. This row corresponds to a previous subspan that has been sent down rendering pipeline. If a one is present, then the current subspan may be stalled until the pixels of the previous subspan has gone through color calculation. If, in the row that has just been read, no pixels are represented by a one, then a determination may be made as to whether any pixels in the current subspan are non-promotable. If so, then the corresponding bit in the current PSA row may be set to one. Otherwise, the Z test may be performed on each pixel of the current subspan.

18 Claims, 4 Drawing Sheets

100

$$\begin{array}{ccccc}
X & X & X & X & b_0 \\
X & X & X & X & b_1 \\
X & X & X & X & b_2 \\
\cdot & & & & \\
\cdot & & & & \\
\cdot & & & & \\
X & X & X & X & b_{N-1}
\end{array}$$

N (rows), 5 (columns)

FIG. 1

EFFICIENT Z TESTING

BACKGROUND OF THE INVENTION

Embodiments of the invention described relate to computer graphics, and in particular, to rendering.

Stated generally, computer graphics rendering is a process by which graphics instructions and data may be received and processed so that image data may be produced. This image data may then be sent to an input/output (I/O) device such as a display. Rendering creates data that may be displayed as an image.

The process of computer graphics rendering may include a number of discrete operations. For example, specific colors of an object or a background may need to be calculated. Texture may also need to be applied to a given surface. Another operation that may be performed in computer graphics rendering is the determination of whether a given object is in front of another object or background. If the foreground object is opaque, the background object may be obscured and the obscured portion of the background object may not need to be rendered. This depth analysis may generally be referred to as Z testing. In a rendered three-dimensional scene, the distance between an object or pixel and the hypothetical camera or the viewer's eye may be determined. Likewise, the comparable distance between the camera and a second, possibly obscuring object or pixel may be determined. These distances may be measured on a hypothetical Z axis, hence the term "Z testing." If the closer object is opaque, the more distant pixel or object need not be rendered.

Note, however, that Z testing may be more complicated in certain implementations. While an object may be in the foreground, for instance, the object may be translucent or transparent. In such a case, the background object may have to be rendered. Such conditions may also be programmed into a Z test.

As mentioned above, the process of Z testing may be only one of several processes that take place during rendering. Moreover, images may have to be generated, modified, and displayed in near-real time. If so, rendering processes must take place efficiently and quickly, given that computer graphics rendering often represents the processing of large amounts of data. Design issues arise, therefore, as to how best to order these processes and how to implement them such that rendering throughput may be maximized.

BRIEF DESCRIPTIONS OF THE FIGURES

The present invention will be described with reference to the accompanying drawings. The drawing in which an element first appears is indicated by the leftmost digit(s) in the corresponding reference number.

FIG. 1 is a representation of a pixel status array, according to an embodiment of the invention.

DETAILED DESCRIPTION OF EMBODIMENTS OF THE INVENTION

Figure 2:
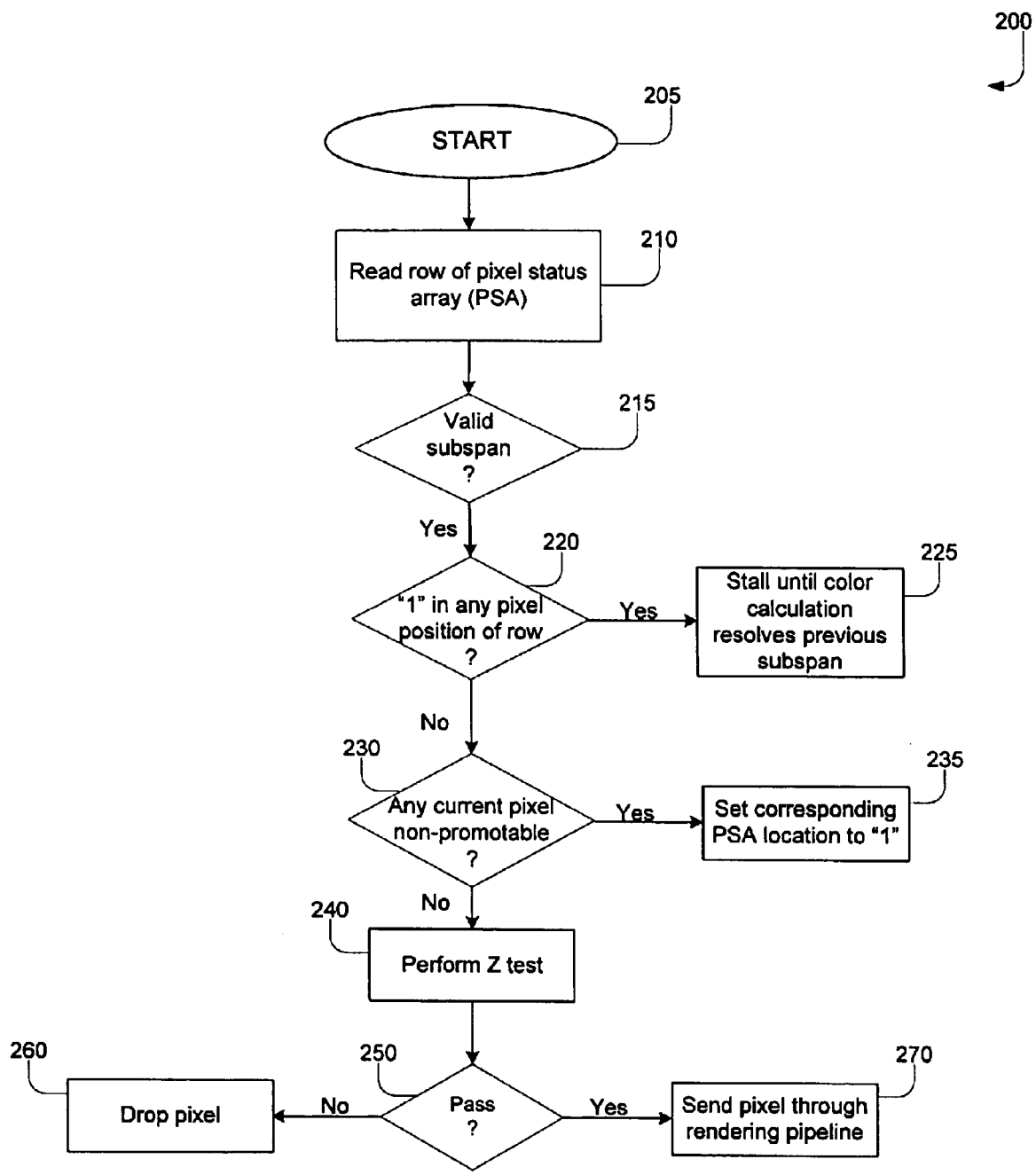
FIG. 2 is a flow chart illustrating the process of performing Z testing, using the pixel status array, according to an embodiment of the invention.

The invention described herein may be embodied, for example, as a method and system for performing Z testing during computer graphics rendering, so as to optimize the efficiency of rendering throughput. For purposes of the invention, pixels may be arranged in subspans, where each subspan may be an array of two pixels by two pixels as would be presented on a computer display. Subspans may be further grouped into larger sets, referred to herein as bins. Each bin may therefore represent a set of subspans, and may represent a discrete area of a scene as shown on a computer display. Some pixels may be designated as non-promotable. If a pixel is non-promotable, this means that even though the pixel may be in the foreground compared to a pixel in the background, the foreground non-promotable pixel does not necessarily obscure the background pixel. The non-promotable pixel may be part of an object or a surface that is transparent or translucent, for example. The status of a pixel as non-promotable may be tracked using a data structure called a pixel status array (PSA). In an embodiment of the invention, the pixel status array may be composed of some number of rows. Each row may contain a number of bits, each bit corresponding to the non-promotable status of a pixel. In an embodiment of the invention, each row of the PSA may include five bits, the first four of which may represent the pixels in a single subspan. If a pixel is non-promotable, the corresponding bit in the PSA may be set in the row corresponding to that pixel's subspan. A PSA may be implemented as hardware or software, or as a combination thereof.

In an embodiment of the invention, the processing of the invention may begin by reading a row of the PSA. The validity of the subspan may be determined, i.e., the process may determine whether the subspan contains at least one pixel. A determination may be made as to whether a one occurs in any of the first four locations in the row. A one would indicate that the corresponding pixel is non-promotable. Note that this row may correspond to a previous subspan of pixels that has been sent into the rendering pipeline for purposes of color calculation and other operations. If a one is present, then the current subspan may be stalled prior to the rendering pipeline, until the pixels of the previous subspan have gone through color calculation.

If, in the row that has just been read, none of the pixels is represented by a one, then a determination may be made as to whether any pixels in the current subspan are non-promotable. If so, then the corresponding bit in the PSA row that corresponds to the current subspan may be set to 1. Otherwise, the Z test may be performed on each of the four pixels of the current subspan. In this manner, pixels that are known to be promotable may be analyzed during the Z test and potentially dropped if they are found to be obscured by another pixel. Such a dropped pixel may therefore never be forwarded for additional processing, such as color calculation. This may eliminate pixels that need not be processed.

Embodiments of the invention are now described with respect to the accompanying figures. As described above, a given pixel may be considered to be either promotable or non-promotable. The promotability or non-promotability of a given pixel may be tracked in the PSA. An exemplary PSA is illustrated in FIG. 1, according to an embodiment of the invention. The PSA may be organized as a two dimensional array. Each row of the array may correspond to a subspan of pixels. In the illustrated embodiment, each subspan contains four pixels, so that each row of the PSA includes four bits, one bit per pixel, followed by a fifth bit. The fifth bit in the row may be referred to herein as a bin flag. The purpose of the bin flag will be described in greater detail below. Each row of the PSA is therefore five bits long in the embodiment illustrated.

An embodiment of the process of the invention is illustrated in FIG. 2. The process may begin at block 205. In block 210, a row of the PSA is read. This row of the PSA may be associated with a previous subspan of pixels that has already been forwarded through the rendering pipeline to color calculation processing. If, in block 215, it is determined that this subspan is valid, then the process may continue at block 220. Here, a current subspan may be considered. Such a subspan has not yet been forwarded on to color calculation in the rendering pipeline. In block 220, a determination may be made as to whether any of the pixels in the current subspan is represented by a one. As described above, a one would signify that the corresponding pixel is non-promotable. If a one is present, then in block 225, this current subspan may be stalled until color calculation logic completes resolution of the previous subspan. Otherwise, the process continues at block 230. Here, a determination may be made as to whether any of the pixels in the current subspan are non-promotable. If so, then the process continues at block 235. Here, the appropriate PSA location may be set to one. If none of the pixels in the current subspan is non-promotable, the process continues at block 240. Here, the Z test may be performed on pixels in the current subspan. Because all of the pixels in the current subspan are promotable, as determined in block 230, the Z test may be performed at this point. In this manner, a pixel that is obscured by a promotable pixel may be dropped without further processing. Therefore, in block 250, a determination may be made as to whether the Z test has been passed. If so, the tested pixel may be forwarded through the rendering pipeline onto the color calculation logic in block 270. Otherwise, the pixel may be dropped in block 260.

In an embodiment of the invention, a current subspan may be found to be non-promotable, and at the same time there is no matching entry in the PSA. In this case, Z testing may then be performed on the pixels of this subspan. If the Z test is passed, then the corresponding PSA bit(s) may be set and the current subspan may be forwarded through the rendering pipeline.

In an embodiment of the invention, each row of the PSA may include a bin flag. The bin flag may be used to address size limitations on the PSA. Ideally, the PSA would contain a row for every subspan in a scene. This is generally not practical, particularly if the PSA is implemented in hardware. To address this problem, subspans may be organized into bins, where each bin may be given a binary designation. Each bin may therefore be viewed as either even or odd. The designation of bins may alternate across a scene, such that if a given bin is odd, its adjacent bin may be considered even. This binary scheme may be encoded as either a zero or a one in the PSA. Hence, for a given subspan, its bin may be identified as either even or odd by the bin flag, i.e., the fifth bit in the row associated with the subspan in the exemplary PSA of FIG. 1. If, given two rows of a PSA, the respective bin flags are different, then it may be inferred that the corresponding subspans are associated with different bins. These subspans will therefore not be evaluated against each other in a Z test. There is, therefore, no point in stalling one of these subspans while the other may be processed in color calculation.

An exception to this process may occur where a current subspan is non-promotable and there is another subspan with overlapping pixels being processed further down the rendering pipeline, e.g., in the color calculation logic. In this case, the current subspan may be stalled, even though the respective bin flags may be different.

Figure 3:
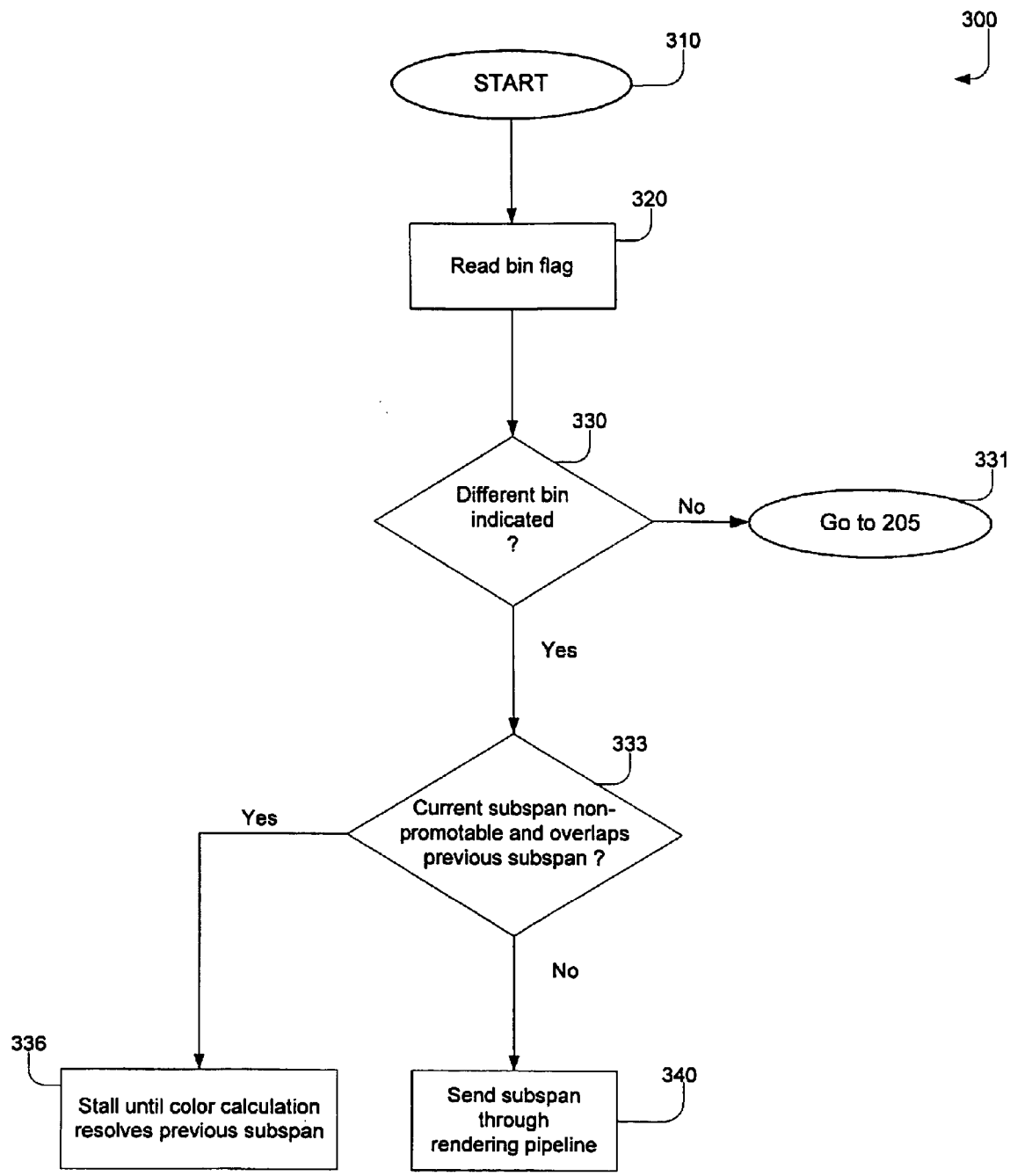
FIG. 3 is a flow chart illustrating the process of checking and acting on the bin flag of a row in the pixel status array, according to an embodiment of the invention.

The processing of bin flags is illustrated in FIG. 3, according to an embodiment of the invention. The process begins at block 310. In block 320, a bin flag may be read. In block 330 a determination may be made as to whether the bin flag indicates a bin other than the bin of the previous subspan. If so, then processing may continue at block 333. Here, a determination may be made as to whether the current subspan is non-promotable and overlaps the previous subspan. If so, then in block 336 the current subspan may be stalled until the color calculation logic of the rendering pipeline resolves the previous subspan. If not, the process continues at block 340. Here, the current subspan may be forwarded through the rendering pipeline. If, in block 330, it is determined that the same subspan may be indicated, then processing may proceed to block 205, illustrated in FIG. 2.

Figure 4:
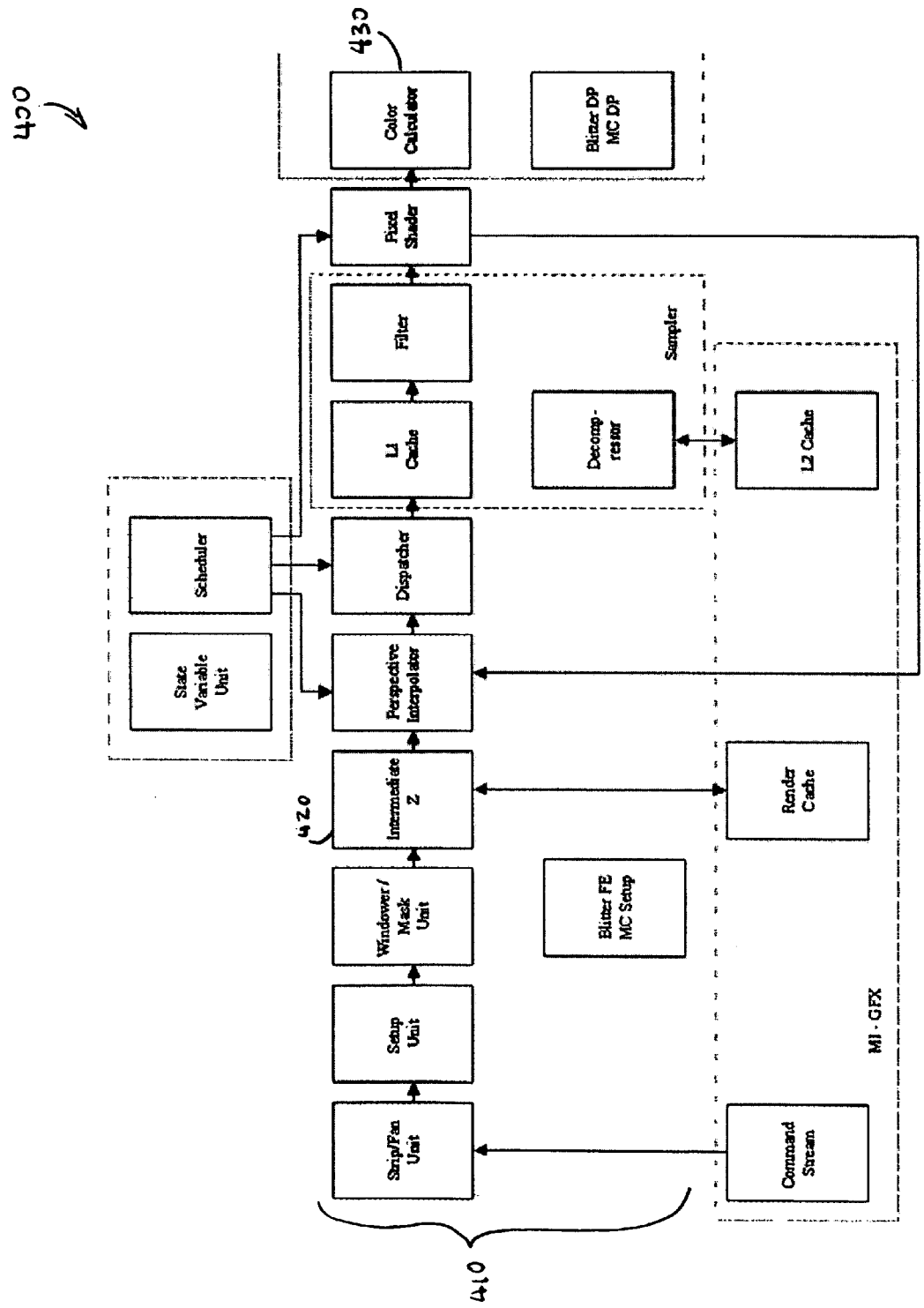
FIG. 4 is a block diagram showing a computer graphics renderer, according to an embodiment of the invention.

The invention may be implemented in a computer graphics renderer, one example of which is illustrated in FIG. 4. Blocks 410 may be viewed as a rendering pipeline. The invention, as illustrated in FIGS. 2 and 3 may be incorporated in block 420, the intermediate Z unit. As described above, the invention may allow the dropping of a pixel without requiring additional processing if the pixel is found to be obscured, as determined by the Z test. As seen in FIG. 4, a pixel that passes the Z test may ultimately be sent through a variety of processes, and ultimately to the color calculator 430. By eliminating pixels that will not ultimately be displayed, the invention may save considerable processing by avoiding the unnecessary color calculation for pixels that are not to be displayed.

The present invention has been described above with the aid of functional building blocks and method steps illustrating the performance of specified functions and relationships thereof. Boundaries of these functional building blocks and method steps have been arbitrarily defined herein for the convenience of the description. Alternate boundaries may be defined so long as the specified functions and relationships thereof are appropriately performed. Any such alternate boundaries are thus within the scope and spirit of the claimed invention. One skilled in the art will recognize that these functional building blocks may be implemented by discrete components, application-specific integrated circuits, processors executing appropriate software or the like, or any combination thereof. Thus, the breadth and scope of the present invention should not be limited by any of the above-described exemplary embodiments, and should be defined only in accordance with the following claims and their equivalents.

While various embodiments of the present invention have been described above, it should be understood that they have been presented by way of example, and not limitation. It will be apparent to persons skilled in the relevant art that various changes in form and detail may be made therein without departing from the spirit and the scope of the invention.

What is claimed is:

1. A method comprising:
    determining if a current subspan comprises a non-promotable pixel and overlaps a previous subspan;
    if so, initiating processing of the current subspan after the previous subspan is processed by color calculation logic of a rendering pipeline; and
    otherwise, forwarding the current subspan through the rendering pipeline.

2. The method of claim 1, wherein the subspans each comprise four pixels in a two by two array.

3. The method of claim 1 including reading bin flags of two rows of a pixel status array (PSA), the rows corresponding to a previous subspan and a current subspan, to determine whether the current subspan and the previous subspan are associated with different bins.

4. The method of claim 3, wherein each row of the PSA represents a subspan and comprises four bits, representing four respective pixels of the subspan, and the bin flag corresponding to the subspan.

5. The method of claim 3 further including, determining if a previous row is present in a pixel status array (PSA), the previous row corresponding to a previous subspan, determining if a non-promotable pixel is indicated in a current row of the PSA; initiating processing of a current subspan corresponding to the current row after the previous subspan is processed by color calculation logic of a rendering pipeline, if a non-promotable pixel is indicated; determining if the current subspan contains a non-promotable pixel; setting a PSA location corresponding to the non-promotable pixel of the current subspan, if the current subspan contains a non-promotable pixel; and performing a Z test on promotable pixels, if the current subspan contains only promotable pixels.

6. The method of claim 5, further comprising:
forwarding the promotable pixel through the rendering pipeline, if any of the promotable pixels passes the Z test; and
dropping the promotable pixel, if the promotable pixel fails the Z test.

7. The method of claim 5, further comprising:
forwarding the non-promotable pixel through the rendering pipeline, if any of the non-promotable pixels passes the Z test; and
dropping the non-promotable pixel, if the non-promotable pixel fails the Z test.

8. The method of claim 5, wherein the Z test is performed in an intermediate Z module of the rendering pipeline.

9. The method of claim 5, wherein each subspan comprises four pixels in a two by two array.

10. The method of claim 9, wherein each row of the PSA represents a subspan and comprises four bits representing the four respective pixels of the subspan.

11. The method of claim 5, further comprising:
setting a bit in the PSA corresponding to the non-promotable pixel; and
performing the Z test on the non-promotable pixel,
if there is no row of the PSA corresponding to the current subspan and the current subspan comprises a non-promotable pixel.

12. The method of claim 5, further comprising:
determining if the previous row represents a valid subspan if the previous row is present in a pixel status array (PSA),
performed before determining if a non-promotable pixel is indicated in the current row of the PSA.

13. An apparatus comprising:
a unit to:
determine if a current subspan comprises a non-promotable pixel and overlaps a previous subspan;
if so, initiate processing of the current subspan after the previous subspan is processed by color calculation logic of a rendering pipeline; and
otherwise, forward the current subspan through the rendering pipeline.

14. The apparatus of claim 11, said unit further to:
initiate processing of a current subspan corresponding to a current row after a previous subspan is processed by color calculation logic of the rendering pipeline, if a non-promotable pixel is indicated in a current row;
determine if the current subspan contains a non-promotable pixel;
initiate a Z test on a promotable pixel if the current subspan contains only a set of promotable pixels that includes the promotable pixel;
execute a Z test on a promotable pixel;
discard the promotable pixel if the Z test is failed; and
send the pixel through a rendering pipeline only if the Z test is passed.

15. The apparatus of claim 14 including determining if a previous row is present in a pixel status array (PSA), the previous row corresponding to a previous subspan, and determining if the previous row represents a valid subspan.

16. The apparatus of claim 15, wherein each row of the PSA corresponds to a subspan and comprises a bit for each pixel of said subspan.

17. The apparatus of claim 15 further including:
said unit to:
read a row of a pixel status array (PSA), the row corresponding to a previous subspan;
initiate processing the current subspan after the previous subspan is processed by color calculation logic of the rendering pipeline if a current subspan comprises a non-promotable pixel and overlaps a previous subspan, otherwise, forwarding the current subspan through the rendering pipeline;
execute a Z test on a promotable pixel;
discard the promotable pixel if the Z test is failed; and
send the pixel through a rendering pipeline only if the Z test is passed.

18. The apparatus of claim 17, wherein said current and previous subspans each comprise four pixels in a two by two array.

* * * * *